3,448,861
AEROTOR PLANTS FOR TREATMENT OF SEWAGE
AND INDUSTRIAL WASTES
William L. Berk, Mount Prospect, Ill., assignor to Lakeside Engineering Corporation, Chicago, Ill., a corporation of Illinois
Filed Dec. 22, 1965, Ser. No. 515,538
Int. Cl. B01d 21/02
U.S. Cl. 210—195           8 Claims

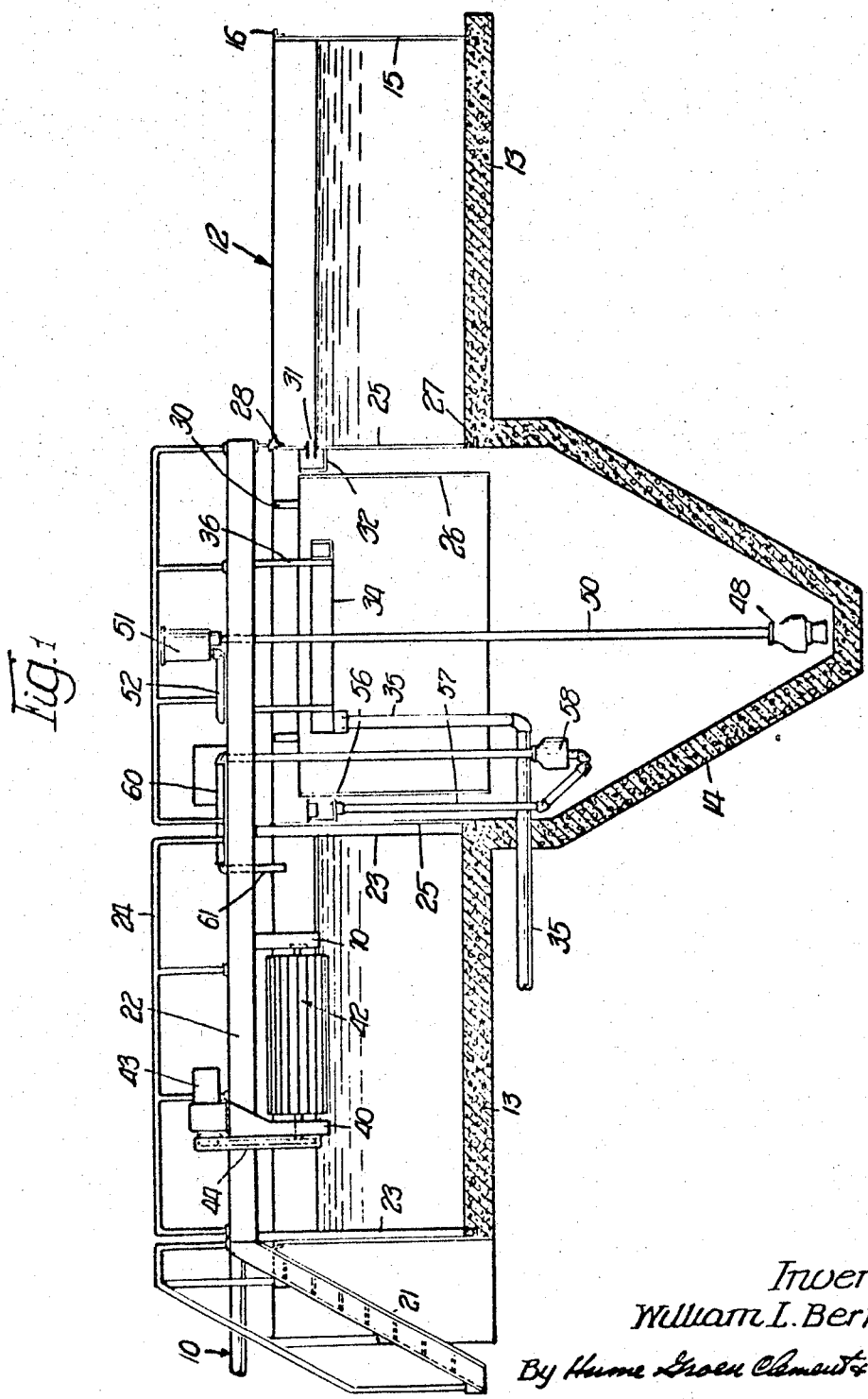

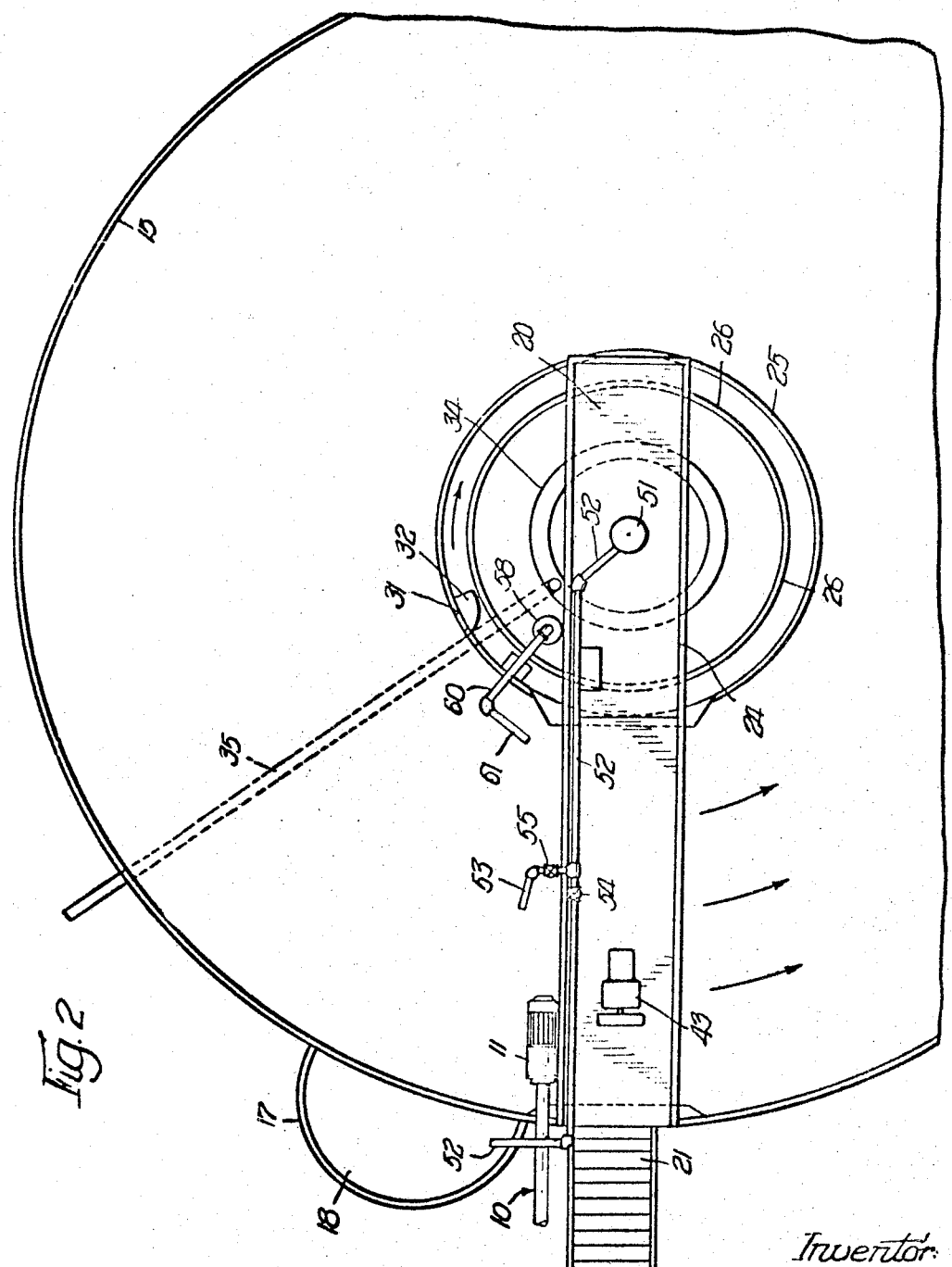

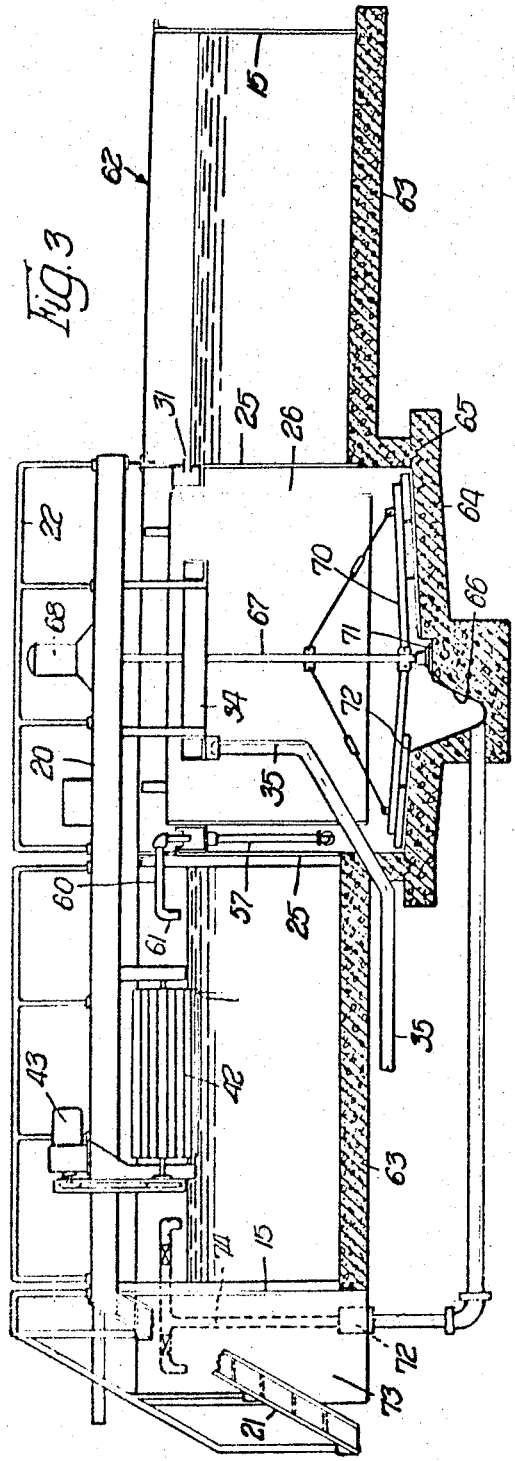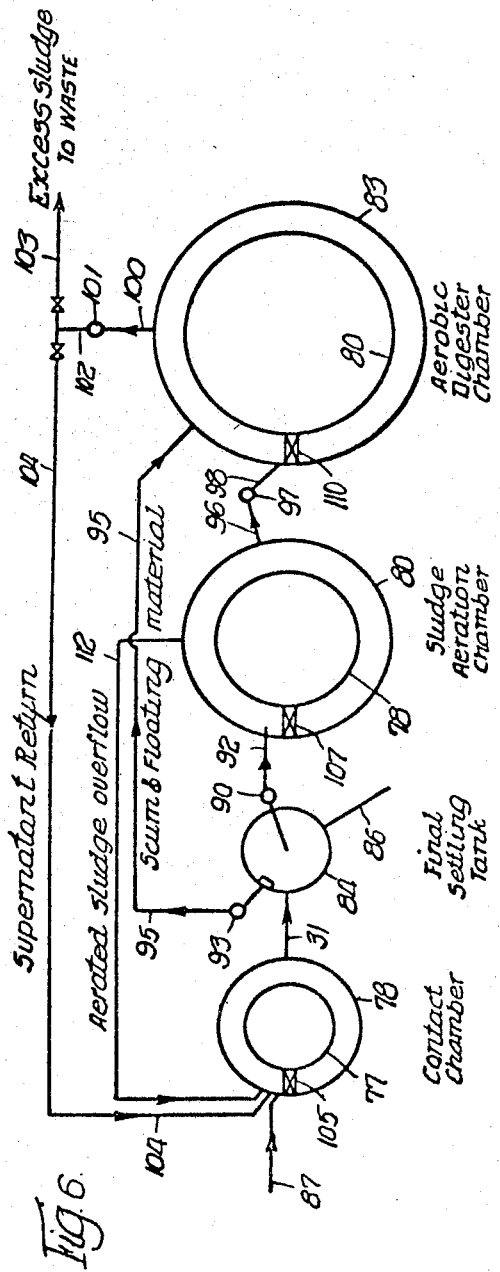

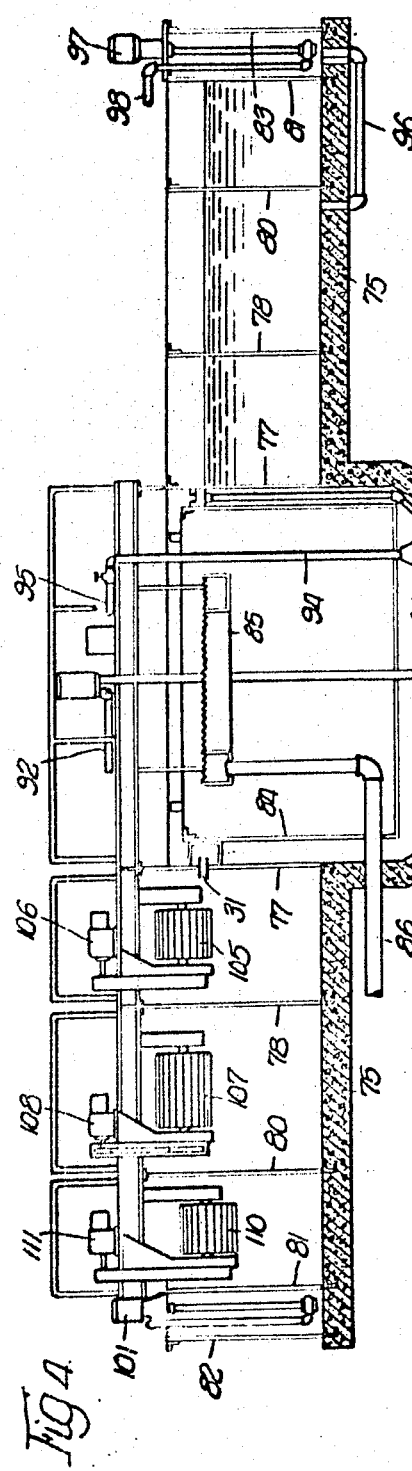

ABSTRACT OF THE DISCLOSURE

The invention provides a compact and unitary aeration unit having a plurality of connecting chambers which are formed by annular concentric tanks. Flow of the liquid sludge takes place from chamber to chamber until a clear effluent is discharged from the system. In the process the settled sludge and solids are collected with provision for recirculation in part and the present apparatus is further characterized by cage rotors, one being located in each of the annular concentric tanks for aerating the liquid sludge and for effecting flow of the same.

The invention relates to the purification and disposal of sewage and industrial wastes and has reference more particularly to aerotor plants and to operating methods for such plants for the complete and economical treatment of used waters from municipal and industrial establishments.

The body of sewage or other used waters when in an oxidation ditch, for example, is in contact at its surface with atmospheric oxygen. When such waters are suitably agitated the agitation accomplishes definite and beneficial results. The surface agitation continuously brings fresh portions of the waste material which is depleted or in part depleted of oxygen in contact with the oxygen of the atmosphere. These fresh portions of waste material appearing at the surface become aerated and the dissolved oxygen immediately begins to stream downwardly through the liquid. This downward movement of the absorbed oxygen is materially aided by the specific type of agitation performed on the body of the liquid. The agitator may be of such construction and driven at such speed that its mechanical action will also assist in breaking up the solid material and thus best conditioning the solid material so that the desired biochemical reactions may take place.

In the oxidation ditch process the cage rotor is the aeration device that entrains the necessary oxygen into the liquid for microbial life and keeps the contents of the ditch mixed and moving. The oxidation ditch is a modified form of the activated sludge process and may be classified in the complete mix, long term aeration group.

The mixed liquor in the ditch is eventually delivered to a clarifier for separation and the clear effluent is discharged from the system. However, all of the sludge formed in the process and settled in the clarifier is returned to the ditch which is operated as a closed system. Since the net growth of the volatile suspended solids will increase, it is necessary periodically to remove some of the sludge from the process.

Based on the foregoing sewage treatment process an object of the invention is to provide a unitary aerator plant which will be completely designed and shop fabricated so as to save engineering time on the part of the municipality or other purchaser and wherein the initial cost of the plant will be less than for conventional concrete constructions.

Another object of the invention is to provide a compact and unitary aeration unit which will have all of the basic advantages of the oxidation ditch with the added advantage of requiring less land area. The unit is rendered compact so that its size is held to a minimum by employing common walls between adjacent chambers.

Another object of the invention is to provide an aeration plant of the character as described wherein one or more cage rotors will be employed as the mechanical surface agitator. The cage rotor has good propulsion characteristics which makes it especially adaptable to this type of plant. Also, the efficiency of the cage rotor is such that less horsepower is required than for any other mechanical apparatus capable of accomplishing similar results.

A further object resides in the provision of an aeration plant which will be compact so as to require the minimum in land area and which will employ the cage rotor as described for producing the mechanical agitation of the waste liquid with provision being made for flexibility in operation by using lower immersions in starting up and by increasing the depth of the immersions as the load increases.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a vertical sectional view taken substantially on line 1—1 of FIGURE 2 and showing one form of a unitary aerotor plant coming within the invention, the same having a hopper-type bottom and a non-mechanized final clarifier;

FIGURE 2 is a top plan view of the aerotor plant as shown in FIGURE 1;

FIGURE 3 is a vertical sectional view of a modified form of aerotor plant embodying the features of the invention and wherein the final clarifier is mechanized;

FIGURE 4 is a vertical sectional view showing another form of aeration plant coming within the invention;

FIGURE 6 is a flow diagram illustrating diagrammatically the liquid flow taking place in the aerotor plant of FIGURES 4 and 5 during operation of the same for the purification of used waters;

FIGURE 7 is a vertical longitudinal sectional view showing the details of a cage rotor such as may be employed in the aerotor plants as described; and FIGURE 8 is a detail sectional view showing a slip pipe connection between an effluent pipe and a weir trough.

Figure 5:
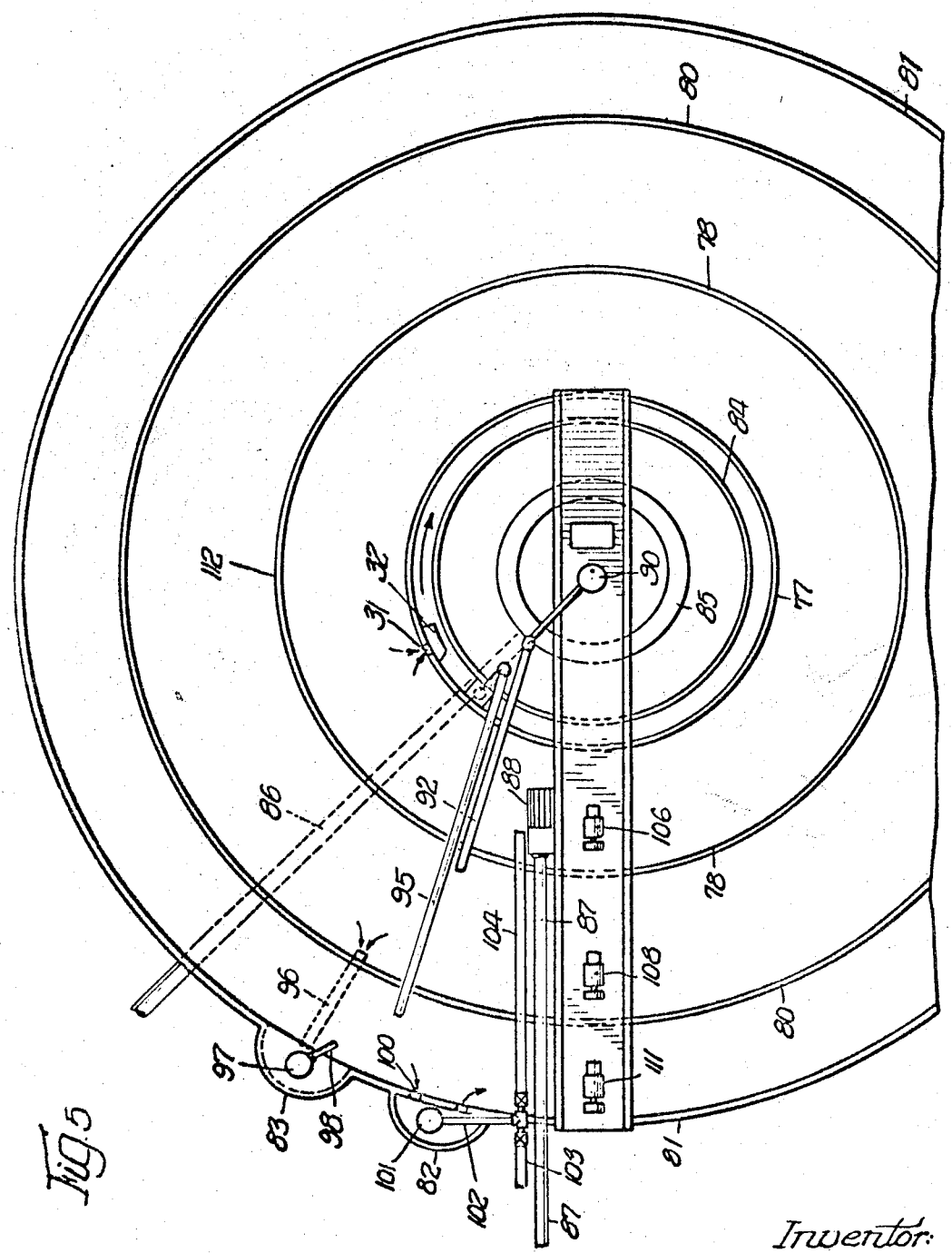
FIGURE 5 is a top plan view of the aerotor plant as shown in FIGURE 4.

In the form of the invention shown in FIGURES 1 and 2 the incoming liquid to be purified is delivered to the aerator unit by the influent pipe 10 which terminates in the bar screen 11 and discharges into the tank generally designated by the numeral 12. The base of the tank 12 is formed of concrete and the same will include the peripheral bottom wall portion 13 and the hopper-type bottom part 14. The outside circular wall 15 is formed of metal and is anchored at its base in the concrete bottom wall 13 and is reinforced at its upper end by the metal flange 16. At the side adjacent the influent pipe 10 the outside wall 15 is provided with a semicircular wall 17, the same having a bottom wall 18 to form a sludge holding tank.

The tank 12 supports a bridge 20 which is provided with the stairs 21 for access to the bridge by the operator for checking the contents of the aerator unit and operation of the several elements and machinery. The bridge essentially includes the horizontally positioned beams 22 which are in turn supported by the bridge supports 23. A hand rail 24 which is preferably sectional may be located on one or both sides of the bridge and also on the stairs 21 for the safety of the operator.

The tank 12 which initially receives the liquid to be treated is divided into peripheral chambers or compartments by the inside circular wall 25 and by the depending skirt 26, both elements being formed of metal. The inside circular wall is anchored at 27 to the concrete forming the hopper-type bottom part 14 and said circular wall is reinforced and strengthened around its top edge by the metal flange 28. The depending skirt 26 is spaced inwardly from the inside circular wall 25 so as to form a peripheral race through which the liquid will flow in a cricular and downward direction towards the hopper type bottom 14. The skirt is suspended from hangers 30 fastened to the tank wall. The skirt projects a short distance above the liquid level of the tank to prevent overflow and said skirt extends in a downward direction for a distance into the hopper type bottom so as to provide a deep peripheral race around the skirt and a deep contiguous clarifying chamber within the skirt.

The liquid from the outer agitation chamber is admitted to the peripheral race by the opening 31 which leads to the inlet trough 32 having a shape for directing the liquid flow around the peripheral race in a clockwise direction as shown in FIGURE 2. In flowing around the peripheral race the liquid will deposit some sludge in the hopper-type bottom 14. This sludge is removed in a manner to be presently described. However, it should be understood that the liquid in flowing around the outside chamber is continuously agitated and the liquid is kept moving so that very little if any of the heavier particles will settle out. Upon reaching the peripheral race agitation of the liquid is terminated and the liquid reaches a quiescent zone within the hopper-type bottom and particularly within the skirt 26 which forms a clarifying chamber for the liquid. The liquid must flow upwardly towards the annular wier 34 and in so doing the liquid passes through a sludge blanket at the entrance to clarifying chamber. This sludge blanket is formed by a heavy concentration of sludge particles and thus flocculation of the said particles is facilitated. The heavier flocculated particles will settle out and the liquid is efficiently purified by the time it reaches the weir trough 34 and flows into the effluent pipe 35 for discharge from the system. The weir trough is conveniently suspended from the bridge by the hangers 36.

The water level within the tank 12 may be adjusted to a limited extent by the slip pipe connection which the effluent pipe 35 has with the launder 34. Referring to the detail showing of FIGURE 8 it will be seen that the bottom wall of the launder is extended downward at a convenient location to form the chamber 37. The terminal end of the effluent pipe projects into the chamber and the slip joint connection thus provided is effectively sealed by the resilient washer 38. The launder 34 can thus be raised or lowered as permitted by the slip connection and this will correspondingly vary the level of the liquid in the tank.

Agitation of the liquid in the outside annular chamber is preferably accomplished by a cage rotor shown in detail in FIGURE 7. The supports 40 depend from the horizontal beams of the bridge 20 and said supports journal the shaft 41 of the cage rotor 42. The power source for the rotor in the form of an electric motor 43 is supported by the bridge and the chain drive 44 operatively connects the motor with the cage rotor which essentially consists of spaced end plates 45, FIGURE 7, connected by a plurality of blades 46. The immersion of the blades 46 in the liquid can be adjusted to suit conditions by raising or lowering the cage rotor or by varying the liquid level and for this purpose the slip connection of FIGURE 8 is provided. Cage rotors have a wide range of oxygen input since their speed can be varied in addition to the extent of the immersion of the blades. This provides for good flexibility in operation since it is possible to employ minimum immersions at startup and which may be increased as the load increases.

As previously described, the liquid in the outside annular chamber is continuously agitated and the liquid is thus kept moving around the chamber with the direction of flow being clockwise in the aerotor plant as shown in FIGURES 1 and 2. The opening 31 is located at a remote distance from the inlet 11 and thus time is provided for extended aeration of the incoming liquid before the liquid is delivered to the peripheral race.

In accordance with the invention the solids which may settle within the hopper-type bottom 14 are removed by the air lift 48 having connection at the bottom with the flow pipe 50. The numeral 51 indicates the air separator and the sludge which is lifted by the air lift 48 and caused to flow upwardly through the pipe 50 is eventually discharged by the sludge pipe 52 into the sludge holding tank 17. However, it is preferred as regards the present system to recirculate the sludge and accordingly the same can be returned to the agitation chamber by the connecting sludge pipe 53. For control purposes the pipes 52 and 53 are provided with the valves 54 and 55, respectively.

The invention also contemplates the recirculation of the scum such as will collect on the surface of the liquid within the peripheral race. The scum box 56 located within the race is connected by the pipe 57 with the air lift 58. From the air lift the pipe 60 conducts the scum and liquid such as may be removed with the scum to the discharge at 61 which thus returns the scum and liquid to the agitation chamber for mixing with the incoming liquid and for additional agitation. The air lifts 48 for the sludge and 58 for the scum may be replaced by any convenent form of pump.

In the form of the invention shown in FIGURE 3 the hopper-type bottom for the final clarifying tank has been replaced with a substantially flat bottom and with mechanical means in the form of scrapers for removing the settled sludge from the bottom of the final clarifier and for delivering the sludge to a sump provided for the purpose. The major change in construction over that as shown in FIGURES 1 and 2 concerns the concrete base for the aerotor plant designated in its entirety by the numeral 62. The annular base portion 63 is disposed horizontally and the circular walls 15 and 25 are suitably anchored in the said base portion. The center base member 64 has interconnecting relation at 65 with portion 63 and the center base member is formed on its inside surface with a sludge sump 66.

As described with the aerator unit of FIGURES 1 and 2 the depending skirt 26 forms a peripheral race with the inside wall 25 and which has the inlet opening 31 formed therein. The weir trough or launder 34 is located within the skirt and the effluent pipe 35 connects therewith by means of the slip connection of FIGURE 8. In this form of the invention the solids settling within the final clarifying tank are positively removed from the bottom of the tank by rotating scraper mechanism. The said mechanism essentially consists of a drive shaft 67, motor 68 and the radially extending arms 70. The drive shaft is supported for rotation at 71 and the scrapers 72, which are carried by the arms 70, scrape the sludge from the bottom wall 64 and deposit the same in the sump 66. From the sump the sludge is withdrawn by the pump 72 and the sludge is deposited in the sludge holding tank 73 by the pipe 74. Provision is made as regards pipe 74 for diverting the sludge either into the sludge holding tank or into the agitation chamber of the aerotor unit. Also, the scum air lift of this modification is the same as for the unit of FIGURES 1 and 2, since the discharge lines 60 and 61 will deliver the scum together with any liquid removed from the peripheral race to the agitation chamber for recirculation.

In FIGURES 4 and 5 the aerotor plant as illustrated is of the contact stabilization type which is a modified form of the activated sludge process. For an understanding of the liquid flow taking place within this form of the invention, reference is made to FIGURE 6. The concrete structure of this plant includes the annular bottom portion 75 and the central hopper-type center portion 76. The metal circular walls 77, 78, 80 and 81 are respectively anchored at their bottom ends in the portion 75 and the walls at their top ends are suitably reinforced by flange members. The sludge holding tanks are formed by the semicircular walls 82 and 83 which are united to and project outwardly from the outside circular wall 81. Said wall 81 and the intermediate wall 80 form an annular chamber in which digestion of the solids takes place and accordingly this chamber is termed the aerobic digester chamber. The intermediate walls 78 and 80 form an annular sludge aeration chamber and walls 77 and 78 form the contact chamber of the aerotor plant. The inside circular wall 78 and the depending skirt form the peripheral race and the final clarifying chamber is located within the skirt 84 with the sludge compartment being located directly below the skirt and comprising the space provided by the hopper-type bottom 76. The weir trough 75 is suspended centrally within the skirt 84 and the clear effluent overflowing into the weir trough is conducted from the tank by the effluent pipe 86.

In operation of the aerotor plant of FIGURES 4 and 5, the incoming liquid to be purified is delivered to the inside contact chamber by the influent pipe 87 and which terminates in the bar screen 88. The structure within the inside circular wall 77 is the same as described for the aerotor plant of FIGURES 1 and 2 and the sludge air lift and the scum air lift are also the same. However in FIGURES 4 and 5 it will be observed that the sludge air lift 90 will discharge the sludge by means of the pipes 91 and 92 into the sludge aeration chamber formed by the circular walls 78 and 80. The scum air lift will discharge the scum and liquid removed from the peripheral race into the aerobic digester chamber by means of the pipes 94 and 95. The excess sludge pump pit 83 is connected by the pipe 96 with the sludge aeration chamber and by means of the pump 97 the contents of the excess sludge pump pit 83 can be discharged from the outlet pipe 98 into the aerobic digester chamber. The digested sludge stilling well 82 is connected by the openings 100 with the aerobic digester chamber and allows the contents a quiescent area to afford settling of digested sludge. The setled contents of the digested sludge in the stilling well can be withdrawn by the pump 101 and delivered to the pipe 102. The T-connecting pipes 103 and 104 with interposed valves allows the operator to discharge the removed sludge either to waste or to return the sludge to the contact chamber formed by the circular walls 77 and 78. The pump 97 may be termed the excess sludge pump, whereas the pump 101 functions as the waste and return sludge pump.

The liquid in each chamber is agitated by mechanical means in the form of a cage rotor all as described and explained with respect to the aerotor plant of FIGURES 1 and 2. For the contact chamber the cage rotor 105 is provided and the motor 106 provides the drive for said rotor. The cage rotor 107 is suitably supported for operation in the sludge aeration chamber and said rotor is driven by the motor 108. For the aerobic digester chamber the cage rotor 110 and motor 111 are provided. One or more openings 112 in the wall 78 are also provided in order to take care of overflow in the sludge aeration chamber. These openings permit flow of the liquid from the sludge aeration chamber to the contact chamber.

In all forms of the invention a compact and highly efficient liquid purification plant is provided and which requires minimum land area since common walls are employed between adjacent chambers. A further advantage resides in the fact that the metal walls and other elements of metal can be fabricated in the factory and conveniently erected on the concrete base. Since the aerotor plants function as a substantially closed system, a highly efficient final clarifier tank is required. The clarifier tanks as shown and described have been found to be efficient settling and clarifying apparatus. Either the hopper type nonmechanized bottom or the flat mechanized bottom may be employed.

Contact stabilization is a modified form of the activated sludge process. Oragnic material in the raw waste is brought into contact, by agitation in the contact chamber, with active bacteria or sludge formed by the process from the sludge aeration chamber. The active microbial colony is given sufficient time in the contact chamber to absorb the organics in the raw waste and form flocculated solids sufficient in density to be removed by settling from the liquid flow in the settling basin. Clear supernatant is decanted from the liquid in the settling basin and discharged to the receiving course. The settled sludge is brought to the sludge aeration chamber where sufficient time is provided to break down the organic matter and also to synthesize new bacteria. This part of the process is a closed system and all bacteria and solids developed by the process should be retained. Excess sludge will develop in the process and this is removed to the aerobic digester where the bacteria undergo endogenous respiration and the end product is fairly inert and may be removed from the system for drying on open sludge beds.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In liquid purification apparatus, a contained unit including an outer circular wall, an inner circular wall and a bottom wall supporting the circular walls, said inner wall being disposed approximately concentrically with and in spaced relation within the outer wall to form an annular agitation chamber, influent means delivering liquid to be purified to the agitation chamber, a depending skirt located in spaced relation within the inner wall to provide a peripheral race around the skirt and a contiguous clarifying chamber within the skirt, a passage in the inner wall permitting flow of the liquid from the agitation chamber into the peripheral race, a launder within the clarifying chamber for decanting the clear liquid, agitating means in the form of a cage rotor for mechanically agitating the liquid in the agitating chamber and for maintaining flow of the liquid around the chamber, means for removing the settled sludge from the bottom wall below the clarifying chamber and for returning said sludge at least in part to the agitation chamber, and means for removing the scum from the peripheral race and for also returning the scum to the agitation chamber.

2. Liquid purification apparatus as defined by claim 1, additionally including means permitting adjustment of the elevated position of the launder for varying the liquid level within the unit, whereby the extent of immersion of the cage rotor with the liquid in the agitation chamber can also be varied.

3. Liquid purification apparatus as defined by claim 1, wherein the means for removing the settled sludge from below the clarifying chamber includes revolving scraper mechanism and pump means for withdrawing the sludge collected by the scraper mechanism.

4. Liquid purification apparatus as defined by claim 1, additionally including an effluent pipe for conducting the clear liquid from the unit, and also including a sealed slip connection between the launder and the effluent pipe for varying the elevated position of the launder and thus the level of the liquid within the unit.

5. In liquid purification apparatus, a contained unit including a plurality of annular concentric chambers formed by an outer circular wall, an inner circular wall and intermediate walls all being spaced with respect to each other, a bottom wall for the unit and which supports the said outer, inner and intermediate walls, a depending skirt located in spaced relation within the inner wall to provide a peripheral race around the skirt and a contiguous clarifying chamber within the skirt, influent means delivering liquid to be purified to the contact chamber formed by the inner wall and the adjacent intermediate wall, a passage in the inner wall permitting flow of the liquid from the contact chamber into the peripheral race, a launder within the clarifying chamber for decanting the clear liquid, means for withdrawing settled sludge from the bottom wall below the clarifying chamber and for delivering the same to the sludge aeration chamber formed by two adjacent intermediate walls, other means for withdrawing the liquid sludge from the sludge aeration chamber and for delivering the same to the aerobic digester chamber formed by the outer wall and the adjacent intermediate wall, additional means for withdrawing the liquid sludge from the aerobic digester chamber and for returning the same at least in part to the contact chamber for recirculation, and means for mechanically agitating the liquid in the contact, sludge aeration and aerobic digester chambers respectively and which additionally maintains flow of the liquid around its respective chamber.

6. Liquid purification apparatus as defined by claim 5, additionally including means for withdrawing scum from the peripheral race and for returning the scum to the aerobic digester chamber.

7. Liquid purification apparatus as defined by claim 5, wherein the means for mechanically agitating the liquid in the several chambers consists of a cage rotor for each chamber.

8. Liquid purification apparatus as defined by claim 5, wherein the means for mechanically agitating the liquid in the several chambers consists of a cage rotor for each chamber, and independent power means for driving each cage rotor.

References Cited

UNITED STATES PATENTS

| | | | |
|---|---|---|---|
| 2,418,950 | 4/1947 | Montgomery | 210—221 |
| 2,901,114 | 8/1959 | Smith et al. | 210—15 X |
| 3,047,492 | 7/1962 | Gambrel | 210—15 X |
| 3,312,346 | 4/1967 | Walker | 210—256 X |
| 3,295,682 | 1/1967 | Schramm | 210—256 X |

FOREIGN PATENTS

| | | |
|---|---|---|
| 651,167 | 3/1951 | Great Britain. |
| 970,470 | 9/1964 | Great Britain. |

MICHAEL E. ROGERS, *Primary Examiner.*

U.S. Cl. X.R.

210—14, 256